Figure 1:
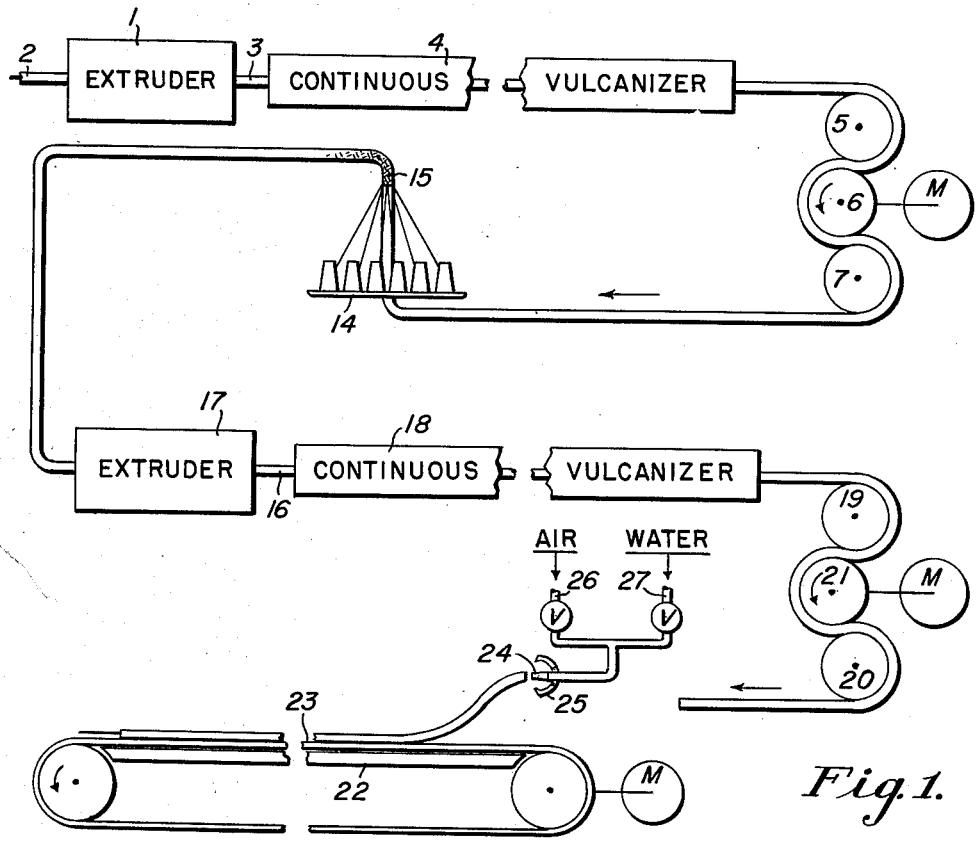

March 14, 1961  J. C. HYDRICK, JR  2,974,713
METHOD OF CONTINUOUSLY PRODUCING REINFORCED HOSE
Filed June 10, 1957

INVENTOR
JULIUS C. HYDRICK, JR.
BY
ATTORNEY

United States Patent Office 2,974,713
Patented Mar. 14, 1961

2,974,713
METHOD OF CONTINUOUSLY PRODUCING REINFORCED HOSE

Julius C. Hydrick, Jr., Riverton, N.J., assignor to H. K. Porter Company Inc., Pittsburgh, Pa., a corporation of Delaware Filed June 10, 1957, Ser. No. 664,690

1 Claim. (Cl. 154—8)

This invention relates to the manufacture of rubber tubing, hose and the like and is particularly directed to providing a novel method for making reinforced hose such as that used for hydraulic conduits in automobiles, for garden hose and for other purposes in which a strong, flexible hose is required, as well as to an improved mandrel for use therein.

In the manufacture of hose of this character it has been customary to form by an extrusion process a tubular uncured rubber inner lining successive lengths of which are next passed axially through a machine in which a textile fiber yarn reinforcing layer is applied progressively by braiding, weaving, knitting or merely by winding the yarns thereon in substantially continuous contiguous spirals; over this reinforcing layer an outer covering layer of uncured rubber is next extruded progressively in intimate contact with the reinforcement and each length is next temporarily encased in an extruded lead sheath. The lengths of the lead-sheathed composite tubing are then wound on large reels, the ends of the tubing being plugged to confine pressurized air or other fluid therein and each length of the reeled lead-sheathed tube is placed in a large autoclave vulcanizer and subjected to external heating by live steam under considerable pressure to heat and thereby fully cure the rubber composition, the internal pressure exerted by the confined fluid insuring compacting of the rubber layers against the intermediate reinforcing layer. After the rubber has been cured the tubing, still confined in its lead sheath, is cooled by a water spray and then fed progressively into a stripping machine operative to remove the lead sheath and reduce it to relatively small pieces for re-use.

The foregoing steps are handled as essentially "batch" operations and each requires large floor space areas for temporary accumulation of "in process" material, subsequent to the manufacturing step that follows, in order to secure quantities sufficient for minimum economical production run operations.

It is obvious from the foregoing that manufacture of hose in this way entails expenditure of large amounts of labor, power and heat and the use of massive equipment adequate for handling the large reels of lead-sheathed hose and that cost of production of the final product is in consequence relatively high. Moreover, the production in quantity of finished hose by this method requires large investment in duplicate machines because of the time element.

It is therefore a principal object of the invention to provide a relatively rapid method of hose production whereby the encasing of the semi-finished hose in a temporary lead sheathing is dispensed with, which permits the use of "continuous" apparatus capable of producing finished hose in individual pieces of greater length than has heretofore been practical, and in which substantially exact uniformity in diameter and concentricity of the hose bore is readily attained.

A further object is to provide an improved forming mandrel for production of elastomeric hose which enables apparatus used therewith to be operated in a substantially continuous manner and hose to be produced more rapidly than has been deemed practical in a single production line.

Other objects, purposes and advantages of the invention will hereafter more fully appear or will be understood from the following description of its practice with reference to the accompanying drawing diagrammatically illustrating in:

Fig. 1 a plan layout of equipment useful in the practice of the method, and in

Figure 2:
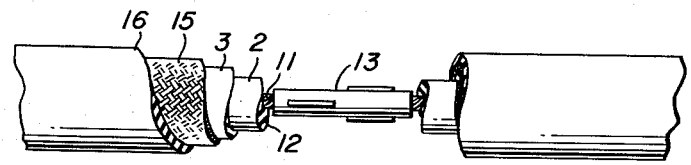

Fig. 2 a fragmentary broken side elevation of typical hose sections and mandrels employed in their manufacture.

Referring now more particularly to the drawing the equipment typified in Fig. 1 includes a plurality of relatively independent units each having functions comparable to those performed by similar units in plants now manufacturing hose and/or other elongated extruded shapes from various raw or partly finished materials although as far as is known never before brought together in the relations here contemplated.

In general the equipment represented in the drawing includes a tube extruder 1 of well known character suitable for continuous extrusion of elastomeric composition in tubular form about a cylindrical core member or mandrel 2 hereafter more fully described which when the extruder is being operated passes axially through the center of its annular extrusion port. Adjacent extruder 1, and preferably so situated relatively thereto as to receive therefrom the mandrel with its extruded tubular covering 3 shortly after the latter is formed, a continuous vulcanizer 4 provides an enclosed vulcanizing chamber in which steam under considerable pressure can be maintained during passage of mandrel and cover longitudinal therethrough.

Prior to the initial introduction of a mandrel and its covering to the vulcanizer it is desirable that an uncovered "standby" mandrel, or other suitable tension member be introduced to the vulcanizer with its ends extending beyond those of the latter, and draft mechanism for progressively drawing through the vulcanizer first this standby mandrel and thereafter a succession of covered ones is positioned adjacent the exit port of the vulcanizer.

This mechanism as shown includes a grooved idler sheave 5, a motor-driven grooved capstan 6 and a second grooved idler 7 each rotatably positioned in respect to the others so as to insure contact in the capstan groove by the mandrel, or its cover, through 180° or more circumferentially of the capstan whereby the draft required to pull the mandrel through the vulcanizer is applied, it being obvious that any other suitable mechanism could be used for the purpose if preferred.

Vulcanizers suitable for continuously vulcanizing during a single pass the rubber covering applied to the mandrel by the extruder are well known in the art, comprising a tube of appropriate length, say, one some 300′ long, having suitable glands (not shown) at its ends whereby the mandrel and its covering can be continuously moved through the vulcanizer longitudinally while being subjected to external heat and pressure of live steam introduced to the vulcanizing chamber, the rate of its passing being controlled by the rotational speed of capstan 6 and adjusted to correspond to the rate at which the rubber covering 3 later to become the inner ply of the finished hose is applied by the extruder 1 to the moving mandrel, and the temperature and pressure of the steam in the vulcanizer are of course likewise controlled to insure proper curing of the rubber covering.

There are also provided a number of elongated mandrels, exemplified by mandrel 2 in Fig. 2 comprising a core made of brass plated steel wire rope 11 of any desired length, for example, 250' which are conveniently handled and lend themselves to production of hose in pieces of about that length, although longer or shorter mandrels may be employed if desired. Rope designated commercially as "7×7" made from 49 individual brass plated steel wires 0.008" in diameter and laid up in 7 strands of 7 wires each is suitable for a mandrel for ⅜" ID hose. Over core 11 there is applied a relatively thick extruded coating 12 of a rubber composition such as a butadiene-styrene copolymer stabilized by heat curing and bonded directly to the wire rope in such manner as to provide a uniform outer diameter corresponding to the inner diameter of the hose to be formed on it, the rubber composition employed being preferably one having high dimensional stability and retaining substantially its original flexibility and elasticity after repeated heating to vulcanizing temperatures.

These mandrels are temporarily secured together in axial alignment by crimping to projecting ends of their wire rope cores a metal cable connector 13, connectors of the type now in general use for connecting electric utility conductors being suitable for this purpose.

In a position appropriate for progressively receiving from capstan 6 the covered mandrel as it is drawn from the vulcanizer there is provided a machine 14 for applying to the outside of the covering, or hose inner lining, a textile reinforcing layer 15 which may be formed thereon from suitable yarns braided, knitted, woven or merely spirally "lapped" by the machine. The machine in the drawing, diagrammatically suggesting a braider for forming a braided reinforcement, is therefore to be considered as but representative of the several types of machines, many of which are well known in the art, which may be used at this station for producing and applying the hose reinforcing ply 15 and it will be obvious for best results its speed of reinforcement production should generally correspond to the speed of production and vulcanization of the extruded rubber covering on the mandrel if continuous operation is maintained.

At a succeeding station the mandrel covered with the now vulcanized and yarn reinforced hose inner plies is supplied with an outer elastomeric covering and the latter is vulcanized in operations not basically different from those by which the inner ply as above described was formed. It will be obvious, however, that a second fabric reinforcing ply (not shown) may be applied over the first by mere duplication of the braiding machine in the manufacture of special hoses comprising double layer fabric reinforcements and a third in like manner if required, although three layers of fabric reinforcement are but rarely used; also that vulcanizing of the underlying elastomeric ply may be deferred until after the fabric reinforcing and outer covering have been applied.

The equipment used in producing the outer covering 16 of the hose is generally similar to extruder 1 and vulcanizer 4 heretofore described and thus comprises a second extruder 17 with which is associated a second continuous vulcanizer 18, the latter, like vulcanizer 4, being desirably provided with a standby mandrel (not shown) extended through its vulcanizing chamber from end to end for facilitating initiation of operations, and draft mechanism including idler sheaves 19, 20 and a motor-driven capstan 21 between them; these latter are respectively substantially similar to sheaves 5 and 7 and capstan 6 associated with vulcanizer 4.

Referring now more particularly to the manufacture of hose with the said equipment, an appropriate number of the mandrels having been prepared and in initiating production it of course being assumed the extruding machines are kept appropriately supplied with uncured rubber composition and the braiding machine with suitable yarn for forming the reinforcing layer 15, a mandrel 2 is fed axially into the first extruder 1 and an inner tubular layer 3 of uncured rubber is formed thereby directly on the mandrel, the latter first being coated with a lubricant or parting compound such as a suitable soap film to facilitate subsequent extraction of the mandrel from the finished hose. Then before the first mandrel has passed entirely through the extruder the leading end of a second similar mandrel is clamped to its trailing end by a connector 13 to thereby enable the extrusion operation to be carried out continuously from one mandrel to another until any desired continuous length of inner lining tube for the hose has been produced.

Preferably several mandrels are thus connected together to allow a single piece of lining tube up to 1000' or more in length to be formed, and progressively fed as it is formed into continuous vulcanizer 4 and where mandrels enough are available even greater lengths may be made; it may be more convenient, however, to produce the inner tube by a batch process and thus to vulcanize it in the usual manner in lengths extruded on a few or several mandrels connected together end to end as described in which case use of vulcanizer 4 may be omitted or, as indicated, vulcanization of the inner tube may be deferred and carried out simultaneously with the vulcanization of the later applied outer covering during its passage through vulcanizer 18.

After vulcanization and withdrawal from the vulcanizer or if vulcanizing is here omitted, at any time after its formation the inner tube is next fed axially through braider 14 which forms the textile reinforcement 15 thereon either by a continuous operation or intermittently on successive lengths of the mandrel supported tube if preferred. It will be apparent that the presence of the mandrel in the tube enables the reinforcing layer 15 to be applied at any desired tension of the yarn without risk of collapsing the tube even when the wall thickness of the latter is not great, which in some circumstances may afford considerable saving of rubber stock in permitting use of thinner wall inner tubes than can be satisfactorily used under former procedures in which the tube must be sufficiently rigid to withstand unsupported the radial inward pressures generated by the braider even though a corresponding thickness of inner wall may not be required in the finished hose.

After application of the reinforcing layer the tube, still conveyed on the mandrels, is next fed to second extruder 17 which applies over reinforcement 15 an outer covering 16 of uncured rubber composition, again either continuously or by a batch process, following which the outer covering and the inner tube as well if it has not been previously vulcanized, is vulcanized during passage through vulcanizer 18.

It is advisable when operations are to be stopped as at the end of a working day or from time to time if the hose is not being produced continuously, an end of a standby mandrel be connected to the trailing end of the last working mandrel carrying an extruded rubber layer and the standby mandrel then drawn into each extruder and vulcanizer or even through the entire equipment if desired, preparatory to resuming operations at a later time, thus permitting the last length of hose to be progressively vulcanized and removed from the second vulcanizer without interrupting the connection between the vulcanizer ends essential for resuming production in the manner described for starting it. Obviously, a suitable length of any elongated strand of appropriate tensile strength and flexibility may be used for a standby mandrel, although the mandrels themselves are usually most conveniently used and operation of the first extruder, braider and second extruder merely stopped in appropriately timed sequence and the yarns in the braider merely cut.

As each vulcanizer for several feet near its exit end is desirably water cooled in the usual manner to facilitate sealing in the steam in its vulcanizing chamber as well as to cool the vulcanized inner tube or hose as the case may be after it has passed therethrough, the vulcanized product normally issues from the cooling chambers at approximately room temperature so that when the finished hose has been drawn through vulcanizer 18, it is complete insofar as manufacturing operations are concerned although still containing the wire-rope-cored mandrel on which it was formed; from the capstan 21 its leading end therefore may be directed to a runout table 22 comprising a motor-driven endless conveyor belt 23 on which the hose and mandrel are carried until a desired length has been extended therealong, preferably a length corresponding to that of one or more of the mandrels. The assembly then is cut and its trailing end, which most economically should be at or about the point at which two mandrels were previously joined together by a connector, applied to an injection fixture 24, equipped with external clamping means 25, to which air under pressure may be supplied through a valve controlled pipe 26 or water under pressure through valve controlled pipe 27, clamp 25 being manipulated to secure the hose to the fixture without clamping the mandrel thereto.

Water is now injected into the hose, a small quantity only normally being required, followed by air under pressure to slightly expand the hose and progressively eject the mandrel from its free end, the initially injected water being impelled partially to enter the space between the hose and mandrel to assist the lubricant originally applied to the latter in separating the hose from the mandrel and also to help seal the assembly against escape of air until the mandrel has been fully ejected.

It will be apparent the latter can now be returned to the first extruder for re-use in the manner described, and that when an adequate number of similar mandrels is available the manufacture of hose may be carried on as a wholly continuous process, or as a process batchwise in part and continuous in part, as when, for example, successive mandrels carrying reinforced inner tubes made in a batch process are connected together endwise before passing through the second extruder 17 and vulcanizer 18.

There is of course opportunity at various points in the production line for some of the unfinished product to accumulate temporarily but this is normally unobjectionable when the speed of operation of the several units in the production line is properly coordinated to effect an average overall production rate.

When the inner tube is made by a batch process its production may be interrupted each time that, say, four interconnected 250′ mandrels have been passed through the first extruder so as to make 1000′ of inner tube in a single length which may be coiled for batch vulcanizing on a pan in the usual way; as a dense mandrel fully occupies its bore there is no risk of the lower coils being collapsed or deformed due to the weight of overlying ones whereby the effective capacity of the pans is thus greatly increased as compared with the length of hose tubing having its bore unoccupied that can be coiled thereon without injury to it.

Moreover by connecting together a plurality of 250′ mandrels and making the inner tube either continuously or in greater lengths than has been considered practical a large saving in the labor entailed in attending the braiding machines is eliminated, since when separate lengths are successively braided thereon it has been the normal practice to stop the machine at the end of each length and cut the yarns supplied to it and to start it again after the leading end of a succeeding length has been manually introduced to the machine, or else to allow the machine to continue to operate and thus produce waste braided tubing for the interval between application of fabric to one tube and the next.

Of course it is normally necessary to stop the braiding machine from time to time to replenish its yarn supply and it is contemplated in "continuous" operation that arrangements will be made for "festooning" the inner tube being produced on mandrels by the first extruder and cured in the first continuous vulcanizer during such interruptions. Also by festooning the reinforcement covered tube and mandrels between the braiding machine and the second extruder a supply of reinforced inner tubing is at hand for the latter during these interruptions.

Again as the cured hose issues from the final continuous vulcanizer 18 preparatory to its being cut into lengths and the mandrels extracted, some of it may accumulate during the mandrel extracting operation, but as this normally takes but a few seconds and the conveyor is desirably constructed to provide linear speeds considerably in excess of that of the hose through the vulcanizer any such accumulation at this station is shortly eliminated.

When the hose after extraction of the mandrels is to be delivered to a purchaser in lengths as produced it may of course be coiled or reeled at once but if it is to be provided with end fittings such as couplings it may be preferable to apply them before coiling or reeling.

While little has been said regarding use of lubricants, separating compounds and the like during manufacture of hose in accordance with my method, it will be obvious that ordinary principles apply, so that when the inner tube is accumulated on pans for initial vulcanizing in a batch process it is normally coated with zinc stearate or the like to prevent adjacent convolutions from adhering together.

It has been suggested herein that the manufacture of hose with the aid of the mandrels described may be carried out as a continuous or semi-continuous process and it will be apparent to those skilled in the art that certain advantages in the use of the mandrels can be realized even where little or no continuity exists. Thus, if desired, each piece of hose of length corresponding to a single mandrel may be made independently of others as a single batch in accordance with procedures which will be obvious from the foregoing and will present a smooth-finish bore of uniform diameter and concentricity with its outer surface as a result of the presence of the mandrel in its bore during manufacture; however, I prefer to realize as well the advantages available through connecting together endwise at least several or an indefinite number of mandrels whereby to carry out the manufacture of hose either semi-continuously or substantially without interruption until an indefinite quantity has been produced. Hence it will further be evident that successive mandrels may be connected together endwise at any intermediate stage of hose manufacture and subsequent operations thereafter proceed as continuous ones.

More particularly individual mandrels may be provided with inner tube material in the first extruder independently and successively and each separately introduced to the first vulcanizer, which may be a continuous or progressive one of the type diagrammatically illustrated, or a conventional one suitable for receiving pans or trays on which lengths of hose are coiled for vulcanizing. The mandrels may also be connected following vulcanization of the inner tubes but prior to successive feeding to the braiding machine, or not until they have passed through the latter and just before each is about to enter the second extruder. It is usually advisable the latter be associated with a continuous vulcanizer, although clearly batch vulcanization may be employed at this stage as well if full non-continuous operation is desired. The evident advantages thereover of at least partially continuous operation are of such significance, however, that it will normally be uneconomic to use the full batch process or to rely on a batch vulcanizer for curing the outer covering of hose manufactured on my mandrel.

In consequence with the aid of the mandrel substantially complete freedom of choice is afforded in regard to selection of those operations which are to be carried out continuously and those to be performed batchwise on successive independent lengths of hose but in any instance the necessity for providing a temporary lead outer sheathing for the hose before subjecting it to final vulcanizing is obviated and in this the use of my mandrel attains perhaps its primary economic advantage apart from its observable effects apparent in the finished hose in regard to uniformity and concentricity of bore to which reference has been made.

Still other changes in the form, relationship and operation of the various instrumentalities employed as well as in the compositions and components of the material utilized in hose or mandrel manufacture may obviously be made without departing from the spirit and scope of the invention as hereinafter claimed.

Having thus described my invention, I claim and desire to protect by Letters Patent of the United States:

The method of continuously producing tubular material of indefinite length which comprises the steps of successively drawing through an annular orifice a plurality of flexible removable cylindrical mandrels of definite length connected end-to-end while extruding thereon a continuous elastomeric covering, progressively applying over said covering a tubular textile reinforcement before the trailing end of each mandrel clears the orifice, coupling to said end the leading end of the succeeding mandrel, severing the extruded covering and surrounding reinforcement adjacent a coupling between two mandrels while substantially simultaneously therewith severing the connection between said mandrels, ejecting the leading one from its covering and surrounding reinforcement and returning it for connection to another mandrel preparatory to repassage through the orifice.

References Cited in the file of this patent

UNITED STATES PATENTS

| | | |
|---|---|---|
| 1,211,370 | Price et al. | Jan. 2, 1917 |
| 1,261,317 | Tew | Apr. 2, 1918 |
| 2,099,843 | Connell | Nov. 23, 1937 |
| 2,308,825 | Rawlings | Jan. 19, 1943 |
| 2,327,638 | Harrison | Aug. 24, 1943 |
| 2,467,642 | Wilson et al. | Apr. 19, 1949 |
| 2,491,152 | Beidle | Dec. 13, 1949 |
| 2,636,923 | Perzel | Apr. 28, 1953 |
| 2,659,932 | McNamee | Nov. 24, 1953 |
| 2,708,176 | Rhodes | May 10, 1955 |
| 2,810,424 | Swartswelter et al. | Oct. 22, 1957 |